S. F. CHANDLER.
SPECTACLES.
No. 181,908. Patented Sept. 5, 1876.
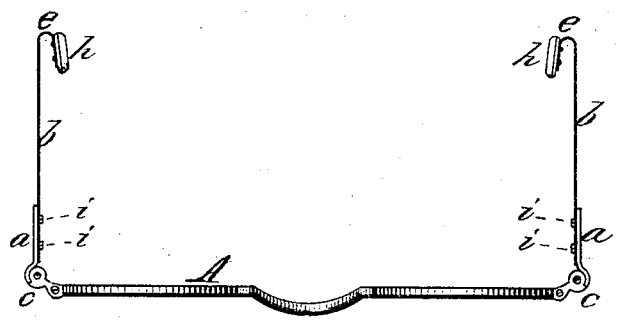
Witnesses.
C. E. Buckland.
D. E. Fisk.
Inventor,
Samuel F. Chandler
By T. A. Curtis.
his Atty.

UNITED STATES PATENT OFFICE.

SAMUEL F. CHANDLER, OF SPRINGFIELD, MASSACHUSETTS, ASSIGNOR TO HIMSELF AND HENRY F. CHANDLER.

IMPROVEMENT IN SPECTACLES.

Specification forming part of Letters Patent No. 181,908, dated September 5, 1876; application filed January 17, 1876.

*To all whom it may concern:*

Be it known that I, SAMUEL F. CHANDLER, of Springfield, in the State of Massachusetts, have invented a new and useful Improvement in Spectacles; and that the following is a full, clear, and exact description thereof, reference being had to the accompanying drawings, making a part of this specification, and to the lettters of reference marked thereon.

The object of my invention is to so form or construct the temple-pieces of spectacles that they may be readily adjusted, may set easily and comfortably against the temples of the wearer, and may be repaired at a considerable saving of time and expense, when a spring becomes broken, without the necessity of making a new temple-piece.

To this end my invention consists in making the temple-pieces of the frame quite short, and attaching thereto, by means of rivets or screws, a temple-spring, which is bent inward and backward at the extreme end, forming a double spring, which is provided with a pad at the end, on the inside, which presses against the temple of the wearer, or against the head near the temple, to retain the spectacles in position, as will be more fully hereinafter described.

Figure 1 represents a pair of spectacles having my improvement applied thereto.

In the drawings, A represents the ordinary spectacle-frame, having the ordinary joints at c, but with the temple-pieces a made very short, say, half an inch long, and each provided with small holes for screws or rivets. The pieces or springs b are made, preferably, of the same material and form in cross-section as the ordinary watch-springs, and have holes made therein by which to secure them, by screws or rivets i, to the short temple-pieces a; and said springs b are bent inward or curved at e, and have the pads h secured on the inside. The pieces or springs b, in adjusting the spectacles, are bent outward, and the spectacles placed in position, and the elasticity of the springs b causes them to spring inward, forcing the pads h against the temples of the wearer, or against his head near the temples. When thus in place, the elasticity of the springs b at the curve e also allows the pads h to spring outward, or give to the pressure against the head, independently of the elasticity or spring of the straight part b, and the consequence is much greater comfort and ease in the pressure required to hold the spectacles in place.

When made in the ordinary manner, even with short temple-pieces or bows, if the latter become broken, and a new temple-piece is required, it is necessary to send the spectacles to the manufacturer for repairs, owing to the fact that the joint, which ordinary silversmiths cannot make except at considerable trouble and expense, has to be made in the same piece with the bow or temple-piece; but, as constructed as herein shown and described, if the spring b should be broken, which is the part most usually broken, any ordinary silversmith or jeweler can readily make a new one, bend the end at e for the pad, and, making the holes for the fastenings i, attach the spring to the temple-piece a with very little expense and trouble, without disturbing the joints c at all.

I am aware that spectacles have heretofore been made, having short temple-pieces, and with a spring joint, as shown in patent to J. Burt and W. W. Willard, No. 22,485, January 4, 1859, and I do not claim the same, nor any feature shown therein, irrespective of my construction and arrangement.

Having therefore described my invention, what I claim as new is—

The combination and arrangement of the short temple-springs b, the additional reversed springs e, the pads h, the fastenings i, and the short temple-pieces a, jointed to the spectacle-frame, all substantially as and for the purposes described.

SAMUEL F. CHANDLER.

Witnesses:
T. A. CURTIS,
C. E. BUCKLAND.